United States Patent
Kirby et al.

(10) Patent No.: US 9,599,470 B1
(45) Date of Patent: Mar. 21, 2017

(54) DIELECTRIC HIGH Q MEMS SHELL GYROSCOPE STRUCTURE

(71) Applicant: HRL LABORATORIES, LLC, Malibu, CA (US)

(72) Inventors: Deborah J. Kirby, Calabasas, CA (US); Raviv Perahia, Los Angeles, CA (US); Hung Nguyen, Los Angeles, CA (US); David T. Chang, Los Angeles, CA (US); Tracy J. Boden, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 419 days.

(21) Appl. No.: 14/024,506

(22) Filed: Sep. 11, 2013

(51) Int. Cl.
*G01C 19/56* (2012.01)
*G01C 19/5691* (2012.01)
*G01C 25/00* (2006.01)

(52) U.S. Cl.
CPC .......... *G01C 19/5691* (2013.01); *G01C 25/00* (2013.01)

(58) Field of Classification Search
CPC .................................................. G01C 19/5691
USPC ...................................................... 73/504.13
See application file for complete search history.

(56) References Cited

U.S. PATENT DOCUMENTS

| | | |
|---|---|---|
| 392,650 A | 11/1888 | Watrous |
| 2,487,165 A | 11/1949 | Miller |
| 3,390,287 A | 6/1968 | Sonderegger |
| 3,766,616 A | 10/1973 | Staudte |
| 4,426,769 A | 1/1984 | Grabbe |
| 4,442,574 A | 4/1984 | Wanuga et al. |
| 4,618,262 A | 10/1986 | Maydan et al. |
| 4,655,081 A | 4/1987 | Burdess |
| 4,870,313 A | 9/1989 | Hirama et al. |
| 4,898,031 A | 2/1990 | Oikawa et al. |
| 4,944,836 A | 7/1990 | Beyer et al. |
| 5,203,208 A | 4/1993 | Bernstein |
| 5,226,321 A | 7/1993 | Varnham et al. |
| 5,260,596 A | 11/1993 | Dunn et al. |
| 5,421,312 A | 6/1995 | Dawson |
| 5,480,747 A | 1/1996 | Vasudev |
| 5,530,408 A | 6/1996 | Vig et al. |
| 5,552,016 A | 9/1996 | Ghanayem |
| 5,578,976 A | 11/1996 | Yao et al. |
| 5,589,724 A | 12/1996 | Satoh et al. |

(Continued)

FOREIGN PATENT DOCUMENTS

| | | |
|---|---|---|
| DE | 4442033 | 5/1996 |
| DE | 19719601 | 11/1998 |

(Continued)

OTHER PUBLICATIONS

P. Shao, L.D. Sorenson, X. Gao, and F. Ayazi, "Wineglass on-a-chip" Solid-State Sensors, Actuators, and Microsystems Workshop Hilton Head Island, South Caroina, Jun. 3-7, 2012, p. 275-278.

(Continued)

*Primary Examiner* — John Chapman, Jr.
(74) *Attorney, Agent, or Firm* — Ladas & Parry

(57) ABSTRACT

A gyroscope includes a cylindrical shell having a first end and a second end, a base on the second end of the shell, a substrate, an anchor coupling the base to the substrate, and electrodes for driving and sensing mechanically separated from the cylindrical shell.

29 Claims, 11 Drawing Sheets

(56) References Cited

U.S. PATENT DOCUMENTS

| | | |
|---|---|---|
| 5,604,312 A | 2/1997 | Lutz |
| 5,605,490 A | 2/1997 | Laffey et al. |
| 5,644,139 A | 7/1997 | Allen et al. |
| 5,646,346 A | 7/1997 | Okada |
| 5,648,849 A | 7/1997 | Canteloup et al. |
| 5,658,418 A | 8/1997 | Coronel et al. |
| 5,665,915 A | 9/1997 | Kobayashi et al. |
| 5,666,706 A | 9/1997 | Tomita et al. |
| 5,668,057 A | 9/1997 | Eda et al. |
| 5,728,936 A | 3/1998 | Lutz |
| 5,783,749 A | 7/1998 | Lee et al. |
| 5,894,090 A | 4/1999 | Tang et al. |
| 5,905,202 A | 5/1999 | Kubena et al. |
| 5,920,012 A | 7/1999 | Pinson |
| 5,928,532 A | 7/1999 | Koshimizu et al. |
| 5,942,445 A | 8/1999 | Kato et al. |
| 5,959,206 A | 9/1999 | Ryrko |
| 5,981,392 A | 11/1999 | Oishi |
| 5,987,985 A | 11/1999 | Okada |
| 6,009,751 A | 1/2000 | Ljung |
| 6,044,705 A | 4/2000 | Neukermans et al. |
| 6,049,702 A | 4/2000 | Tham et al. |
| 6,081,334 A | 6/2000 | Grimbergen et al. |
| 6,089,088 A | 7/2000 | Charvet |
| 6,094,985 A | 8/2000 | Kapels et al. |
| 6,114,801 A | 9/2000 | Tanaka et al. |
| 6,145,380 A | 11/2000 | MacGugan et al. |
| 6,151,964 A | 11/2000 | Nakajima |
| 6,155,115 A | 12/2000 | Ljung |
| 6,164,134 A | 12/2000 | Cargille |
| 6,182,352 B1 | 2/2001 | Deschenes et al. |
| 6,196,059 B1 | 3/2001 | Kosslinger |
| 6,204,737 B1 | 3/2001 | Ella |
| 6,207,008 B1 | 3/2001 | Kijima |
| 6,236,145 B1 | 5/2001 | Biernacki |
| 6,250,157 B1 | 6/2001 | Touge |
| 6,263,552 B1 | 7/2001 | Takeuchi et al. |
| 6,282,958 B1 | 9/2001 | Fell et al. |
| 6,289,733 B1 | 9/2001 | Challoner et al. |
| 6,297,064 B1 | 10/2001 | Koshimizu |
| 6,349,597 B1 | 2/2002 | Folkmer et al. |
| 6,367,326 B1 | 4/2002 | Okada |
| 6,367,786 B1 | 4/2002 | Gutierrez et al. |
| 6,413,682 B1 | 7/2002 | Shibano et al. |
| 6,417,925 B1 | 7/2002 | Naya |
| 6,424,418 B2 | 7/2002 | Kawabata et al. |
| 6,426,296 B1 | 7/2002 | Okojie |
| 6,432,824 B2 | 8/2002 | Yanagisawa |
| 6,481,284 B2 | 11/2002 | Geen et al. |
| 6,481,285 B1 | 11/2002 | Shkel et al. |
| 6,492,195 B2 | 12/2002 | Nakanishi |
| 6,513,380 B2 | 2/2003 | Reeds |
| 6,514,767 B1 | 2/2003 | Natan |
| 6,515,278 B2 | 2/2003 | Wine et al. |
| 6,571,629 B1 | 6/2003 | Kipp |
| 6,584,845 B1 | 7/2003 | Gutierrez et al. |
| 6,614,529 B1 | 9/2003 | Tang |
| 6,621,158 B2 | 9/2003 | Martin et al. |
| 6,627,067 B1 | 9/2003 | Branton et al. |
| 6,628,177 B2 | 9/2003 | Clark et al. |
| 6,629,460 B2 | 10/2003 | Challoner |
| 6,651,027 B2 | 11/2003 | McCall et al. |
| 6,662,656 B2* | 12/2003 | Jeanroy ............ G01C 19/5691 73/504.02 |
| 6,686,807 B1 | 2/2004 | Giousouf et al. |
| 6,710,681 B2 | 3/2004 | Figueredo et al. |
| 6,715,352 B2 | 4/2004 | Tracy |
| 6,744,335 B2 | 6/2004 | Ryhanen |
| 6,750,728 B2 | 6/2004 | Takahashi et al. |
| 6,756,304 B1 | 6/2004 | Robert |
| 6,768,396 B2 | 7/2004 | Klee et al. |
| 6,796,179 B2 | 9/2004 | Bae et al. |
| 6,806,557 B2 | 10/2004 | Ding |
| 6,815,228 B2 | 11/2004 | Usui et al. |
| 6,856,217 B1 | 2/2005 | Clark et al. |
| 6,862,398 B2 | 3/2005 | Elkind et al. |
| 6,883,374 B2 | 4/2005 | Fell et al. |
| 6,915,215 B2 | 7/2005 | Closkey et al. |
| 6,933,164 B2 | 8/2005 | Kubena |
| 6,943,484 B2 | 9/2005 | Clark et al. |
| 6,985,051 B2 | 1/2006 | Nguyen et al. |
| 7,040,163 B2 | 5/2006 | Shcheglov |
| 7,057,331 B2 | 6/2006 | Shimodaira et al. |
| 7,118,657 B2 | 10/2006 | Golovchenko et al. |
| 7,152,290 B2 | 12/2006 | Junhua et al. |
| 7,168,318 B2 | 1/2007 | Challoner et al. |
| 7,211,933 B2 | 5/2007 | Kawakubo |
| 7,224,245 B2 | 5/2007 | Song et al. |
| 7,232,700 B1 | 6/2007 | Kubena |
| 7,234,214 B2 | 6/2007 | Xu |
| 7,237,315 B2 | 7/2007 | Kubena |
| 7,281,425 B2* | 10/2007 | Chikovani ......... G01C 19/5691 73/504.13 |
| 7,295,088 B2 | 11/2007 | Nguyen et al. |
| 7,317,354 B2 | 1/2008 | Lee |
| 7,404,325 B2* | 7/2008 | Delevoye ............ G01C 19/5691 331/154 |
| 7,446,628 B2 | 11/2008 | Morris, III |
| 7,459,099 B2 | 12/2008 | Kubena et al. |
| 7,459,992 B2 | 12/2008 | Matsuda et al. |
| 7,479,846 B2 | 1/2009 | Inoue et al. |
| 7,490,390 B2 | 2/2009 | Kawakubo et al. |
| 7,526,957 B2* | 5/2009 | Watson ................ G01C 19/56 73/504.13 |
| 7,543,496 B2 | 6/2009 | Ayazi et al. |
| 7,551,054 B2 | 6/2009 | Mizuno et al. |
| 7,555,824 B2 | 7/2009 | Chang |
| 7,557,493 B2 | 7/2009 | Fujimoto |
| 7,559,130 B2 | 7/2009 | Kubena et al. |
| 7,564,177 B2 | 7/2009 | Yoshimatsu et al. |
| 7,579,748 B2 | 8/2009 | Kuroda |
| 7,579,926 B2 | 8/2009 | Jhung |
| 7,581,443 B2 | 9/2009 | Kubena |
| 7,663,196 B2 | 2/2010 | Liu et al. |
| 7,671,427 B2 | 3/2010 | Kim et al. |
| 7,675,224 B2 | 3/2010 | Tanaya |
| 7,750,535 B2 | 7/2010 | Kubena et al. |
| 7,757,393 B2 | 7/2010 | Ayazi et al. |
| 7,791,432 B2 | 9/2010 | Piazza et al. |
| 7,802,356 B1 | 9/2010 | Chang |
| 7,830,074 B2 | 11/2010 | Kubena |
| 7,872,548 B2 | 1/2011 | Nishihara et al. |
| 7,884,930 B2 | 2/2011 | Kirby |
| 7,895,892 B2 | 3/2011 | Aigner |
| 7,994,877 B1 | 8/2011 | Kubena |
| 8,138,016 B2 | 3/2012 | Chang |
| 8,151,640 B1 | 4/2012 | Kubena |
| 8,176,607 B1 | 5/2012 | Kubena |
| 8,522,612 B1 | 9/2013 | Kubena |
| 8,766,745 B1 | 7/2014 | Kubena |
| 9,404,748 B2 | 8/2016 | Perahia |
| 2002/0066317 A1 | 6/2002 | Lin |
| 2002/0072246 A1 | 6/2002 | Goo et al. |
| 2002/0074947 A1 | 6/2002 | Tsukamoto |
| 2003/0003608 A1 | 1/2003 | Arikado et al. |
| 2003/0010123 A1 | 1/2003 | Malvern et al. |
| 2003/0029238 A1 | 2/2003 | Challoner |
| 2003/0196490 A1 | 10/2003 | Cardarelli |
| 2003/0205948 A1 | 11/2003 | Lin et al. |
| 2004/0055380 A1 | 3/2004 | Shcheglov et al. |
| 2004/0065864 A1 | 4/2004 | Vogt et al. |
| 2004/0189311 A1 | 9/2004 | Glezer |
| 2004/0211052 A1 | 10/2004 | Kubena et al. |
| 2004/0239341 A1 | 12/2004 | Aoyagi et al. |
| 2005/0034822 A1 | 2/2005 | Kim et al. |
| 2005/0062368 A1 | 3/2005 | Hirasawa |
| 2005/0093659 A1 | 5/2005 | Larson et al. |
| 2005/0156309 A1 | 7/2005 | Fujii |
| 2005/0260792 A1 | 11/2005 | Patel |
| 2006/0016065 A1 | 1/2006 | Nagaura |
| 2006/0022556 A1 | 2/2006 | Bail et al. |
| 2006/0055479 A1 | 3/2006 | Okazaki et al. |
| 2006/0066419 A1 | 3/2006 | Iwaki et al. |
| 2006/0139121 A1 | 6/2006 | Jhung |

(56) References Cited

U.S. PATENT DOCUMENTS

| | | | |
|---|---|---|---|
| 2006/0197619 | A1 | 9/2006 | Oishi et al. |
| 2006/0213266 | A1 | 9/2006 | French et al. |
| 2006/0252906 | A1 | 11/2006 | Godschalx et al. |
| 2007/0017287 | A1 | 1/2007 | Kubena |
| 2007/0034005 | A1 | 2/2007 | Acar et al. |
| 2007/0205839 | A1 | 9/2007 | Kubena et al. |
| 2007/0220971 | A1 | 9/2007 | Ayazi et al. |
| 2007/0240508 | A1 | 10/2007 | Watson |
| 2008/0034575 | A1 | 2/2008 | Chang et al. |
| 2008/0074661 | A1 | 3/2008 | Zhang |
| 2008/0096313 | A1 | 4/2008 | Patel |
| 2008/0148846 | A1 | 6/2008 | Whelan et al. |
| 2009/0146527 | A1 | 6/2009 | Lee |
| 2009/0189294 | A1 | 7/2009 | Chang |
| 2010/0000324 | A1 | 1/2010 | Yoshikawa et al. |
| 2010/0020311 | A1 | 1/2010 | Kirby |
| 2010/0148803 | A1 | 6/2010 | Ohnishi et al. |
| 2010/0314969 | A1 | 12/2010 | Gaidarzhy et al. |
| 2011/0107838 | A1 | 5/2011 | Suijlen et al. |
| 2012/0000288 | A1 | 1/2012 | Matsuura et al. |
| 2012/0212109 | A1 | 8/2012 | Yamazaki et al. |
| 2012/0266682 | A1 | 10/2012 | Torashima et al. |
| 2013/0104653 | A1* | 5/2013 | Bernstein ............ G01C 19/5691 73/504.13 |
| 2013/0214461 | A1 | 8/2013 | Shkel et al. |

FOREIGN PATENT DOCUMENTS

| | | |
|---|---|---|
| EP | 0461761 | 12/1991 |
| EP | 0531985 | 3/1993 |
| EP | 1055908 | 11/2000 |
| EP | 0971208 | 12/2000 |
| JP | 57-091017 | 6/1982 |
| JP | 401129517 | 5/1989 |
| JP | 04322507 | 11/1992 |
| JP | 05286142 | 11/1993 |
| JP | 06232678 | 8/1994 |
| JP | 6-318533 | 11/1994 |
| JP | 08330878 | 12/1996 |
| JP | 9-247025 | 9/1997 |
| JP | 2003-318685 | 11/2003 |
| JP | 2005-180921 | 7/2005 |
| JP | 2006-352487 | 12/2006 |
| KR | 10-2001-0110428 | 12/2001 |
| WO | 84/00082 | 1/1984 |
| WO | 96/38710 | 12/1996 |
| WO | 98/15799 | 4/1998 |
| WO | 00/68640 | 11/2000 |
| WO | 01/44823 | 6/2001 |
| WO | 01/74708 | 10/2001 |
| WO | 02/12873 | 2/2002 |
| WO | 2005/121769 | 12/2005 |
| WO | 2006/010206 | 2/2006 |
| WO | 2006/103439 | 10/2006 |

OTHER PUBLICATIONS

M.L. Chan, J. Xie, P. Fondal, H. Najar, K. Yamazaki, L. Lin and D.A. Horsley, "Micromachined Polycrystalline Diamond Hemispherical Shell Resonators" Solid-State Sensors, Actuators, and Microsystems Workshop Hilton Head Island, South Carolina, Jun. 3-7, 2012, p. 355-358.

D. Senkal, C.R. Raum, A.A. Trusov, and A.M. Shkel, "Titania silicate/fused Quartz Glassblowing for 3-D Fabrication of Low Internal Wineglass Micro-structures" Solid-State Sensors, Actuators, and Microsystems Workshop Hilton Head Island, South Carolina, Jun. 3-7, 2012, p. 267-270.

"Formulas for natural frequency and mode shape", R.D. Blevins, Krieger Publishing Company, pp. 298-299, 2001.

U.S. Appl. No. 10/426,931, filed Apr. 30, 2003, Kubena.
U.S. Appl. No. 11/458,911, filed Jul. 20, 2006, Kubena.
U.S. Appl. No. 11/502,336, filed Aug. 9, 2006, Chang.
U.S. Appl. No. 11/818,797, filed Jun. 14, 2007, Kirby.
U.S. Appl. No. 11/881,461, filed Jul. 27, 2007, Kubena.
U.S. Appl. No. 12/026,486, filed Feb. 5, 2008, Kubena.
U.S. Appl. No. 12/027,247, filed Feb. 6, 2008, Kubena.
U.S. Appl. No. 12/034,852, filed Feb. 21, 2008, Chang.
U.S. Appl. No. 12/268,309, filed Nov. 10, 2008, Kubena.
U.S. Appl. No. 12/488,784, filed Jun. 22, 2009, Kubena.
U.S. Appl. No. 13/410,998, filed Mar. 2, 2012, Kubena.
U.S. Appl. No. 13/930,769, filed Jun. 28, 2013, Perahia.
U.S. Appl. No. 14/024,506, filed Sep. 11, 2013, Kirby.
U.S. Appl. No. 14/456,808, filed Aug. 11, 2014, Kirby.
U.S. Appl. No. 15/083,190, filed Mar. 28, 2016, Perahia.
U.S. Appl. No. 13/930,769 (now published U.S. Pat. No. 9,404,748), Notice of Allowance mailed on Apr. 6, 2016.
U.S. Appl. No. 13/930,769 (now published as U.S. Pat. No. 9,404,748), Office Action mailed on Mar. 10, 2016.
U.S. Appl. No. 13/930,769 (now published as U.S. Pat. No. 9,404,748), Office Action mailed on Nov. 4, 2015.
U.S. Appl. No. 13/930,769 (now published as U.S. Pat. No. 9,404,748), Office Action mailed on Jul. 20, 2015.
U.S. Appl. No. 14/456,808 (filed Aug. 11, 2014, unpublished, non publication request filed), Restriction mailed on Sep. 9, 2015.
U.S. Appl. No. 14/456,808 (filed Aug. 11, 2014, unpublished, non publication request filed), Office Action mailed on Jan. 19, 2016.
U.S. Appl. No. 14/456,808 (filed Aug. 11, 2014, unpublished, non publication request filed), Office Action mailed on Aug. 22, 2016.
Aaltonen, T., et al., "ALD of Rhodium thin films from Rh(acac)$_3$ and Oxygen," Electrochemical and Solid-State Lettersm, 8, (8) C99-C101 (2005).
Abe, Takashi, et al., "One-chip multichannel quartz crystal microbalance (QCM) fabricated by Deep RIE," Sensors and Actuators, vol. 82, pp. 139-143 (2000).
Aoyagi, et al., "Development of Surface Micromachinable Capacitive Accelerometer Using Fringe Electrical Field," Proc. IEEE Transducers 2003, pp. 1383-1386 (2003).
Barbour et al., "Micromechanical Silicon Instrument and Systems Development at Draper Laboratory," AIAA Guidance Navigation and Control Conference, 1996, Paper No. 96-3709 (20 pages).
Burdess et al., "The Theory of a Piezoelectric Disc Gyroscope", Jul. 1986, IEEE vol. AES 22, No. 4; p. 410-418.
Cho, J. et. al, "A High-Q Birdbath Resonator Gyroscope (BRG)," IEEE Transducers 2013, Barcelona, Spain, Jun. 16-20, 2013, pp. 1847-1850.
Cleland, A.N., et al., "Fabrication of High Frequency Nanometer Scale Mechanical Resonators From Bulk Si Crystals," Applied Physics Letters, 69 (18), Oct. 28, 1996.
Evoy, S., et al., "Temperature-dependent internal friction in silicon nanoelectromechanical systems," Applied Physics Letters, vol. 77, No. 15, pp. 2397-2399 (Oct. 9, 2000).
Freidht, J.-M. and Carry, E., "Introduction to the quartz tuning fork", American Journal of Physics 75, 415 (2007), pp. 415-422 (9 pages).
Fujita et al., "Disk-shaped bulk micromachined gyroscope with vacuum sealing," Sensors and Actuators, vol. 82, May 2000, pp. 198-204.
Greer, J.A., et al., "Properties of SAW resonators fabricated on quartz substrates of various qualities," Ultrasonics Symposium, 1994 IEEE, vol. 1, Nov. 1-4, 1994, pp. 31-36.
Griffiths, D. J. (1999). Introduction to Electrodynamics, Third Edition, Upper Saddle River: Prentice Hall, pp. 179-196 (22 pages).
Heidari, et al., "Micromachined Polycrystalline Diamond Hemispherical Shell Resonators," Transducers 2013, Barcelona, Spain, Jun. 16-20, 2013, pp. 2415-2418.
Johnson et al., "Surface Micromachined Angular Rate Sensor," A1995 SAE Conference, Paper No. 950538, pp. 77-83 (9 pages).
Kuhns, Richard Michael, Design and Fabrication of a Micromechanical Gyroscope Thesis, Jun. 17, 1996, Pertinent Section: Chapter 5.
Lee, Kwan H., "Cooling and control of a cavity opto-electromechanical system" Phys. Rev. Lett., vol. 104, 123604 2010 (4 pages).
Lin, J. W, et al., "A Robust High-Q Micromachined RF Inductor for RFIC Applications," IEEE Transactions on Electronic Devices, vol. 52, No. 7, pp. 1489-1496 (Jul. 2005).

(56) References Cited

OTHER PUBLICATIONS

Park, K.J., et al., "Selective area atomic layer deposition of rhodium and effective work function characterization in capacitor structures," Applied Physics Letters 89, 043111 (2006), 3 pages.

Perahia, R., et al. "Electric gradient force drive mechanism for novel microscale all-dielectric gyroscope," Micro Electro Mechanical Systems (MEMS), 2014 IEEE 27th International Conference on Jan. 26-30, 2014.

Putty et al., "A Micromachined Vibrating Ring Gyroscope," Solid State Sensor and Actuator Workshop, Transducer Research Foundation, Hilton Head, 1994, pp. 213-220.

Sirbuly, Donald J. et al., Multifunctional Nanowire Evanescent Wave Optical Sensors, Advanced Materials, 2007 (published online: Dec. 5, 2006), 19, pp. 61-66.

Skulski et al., "Planar resonator sensor for moisture measurements", Microwaves and Radar, 1998, MIKON '98, 12th International Conf., vol. 3, May 20-22, 1998, pp. 692-695.

Sorenson, L.D., et al., "Effect of Thickness Anisotropy on Degenerate Modes in Oxide Micro-Hemispherical Shell Resonators," Proc. IEEE MEMS 2013, Taipei, Taiwan, Jan. 20-24, 2013, pp. 169-172.

Tang et al., "A Packaged Silicon MEMS Vibratory Gyroscope for Microspacecraft," Proceedings IEEE, 10th Annual Int. Workshop on MEMS, Japan, 1997, pp. 500-505.

Tang et al., "Silicon Bulk Micromachined Vibratory Gyroscope," Jet Propulsion Lab, Jun. 2, 1996 (6 pages).

Unterreithmeier, Q.P., "Universal transduction scheme for nanomechanical systems based on dielectric forces," Nature, vol. 458, pp. 1001-1004 (Apr. 2009).

White, Lan M., et al., Increasing the Enhancement of SERS with Dielectric Microsphere Resonators, Spectroscopy-Eugene, Apr. 2006 (5 pages).

Wright et al., "The HRG Applied to a Satellite Attitude Reference System," Guidance and Control, AASAAS, 1994, vol. 86: pp. 55-67 (14 pages).

Yan, Fei, et al., "Surface-enhanced Raman scattering (SERS) detection for chemical and biological agents," IEEE Sensors Journal, vol. 5, No. 4, Aug. 2005 (7 pages).

Yazdi, N., et al. , "Micromachined Inertial Sensors," Proceedings of the IEEE, vol. 86, No. 8, pp. 1640-1659 (Aug. 1998).

Zhiyong et al., "Ultra-Low Noise Charge Sensitive Amplifier for MEMS Gyroscope," 2009 Fifth International Conference on MEMS, NANO, and Smart Systems, 2009, pp. 29-32.

Zotov, S.A., Journal of Microelectromechanical Systems, vol. 21, No. 3, Jun. 2012, pp. 509-510.

* cited by examiner

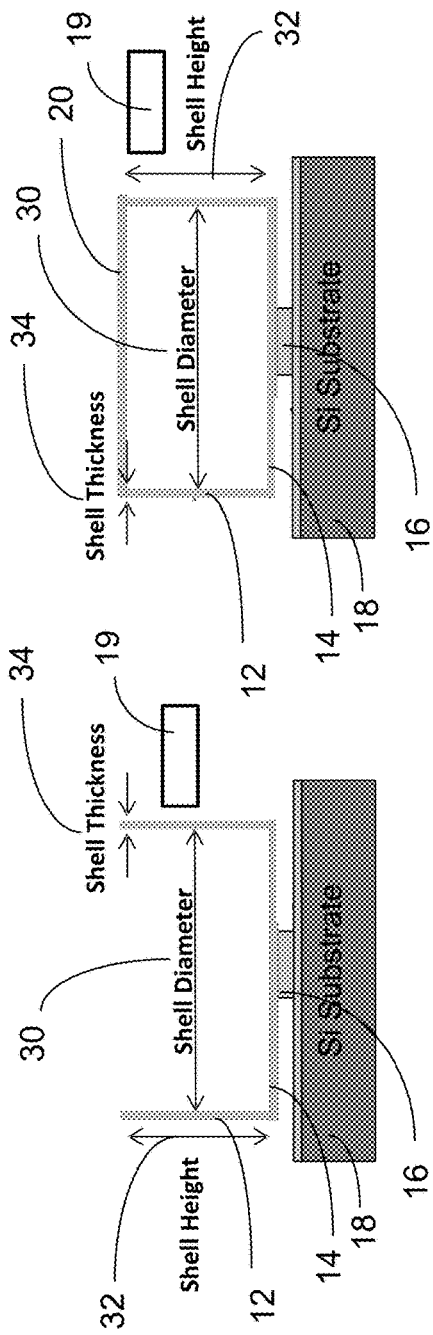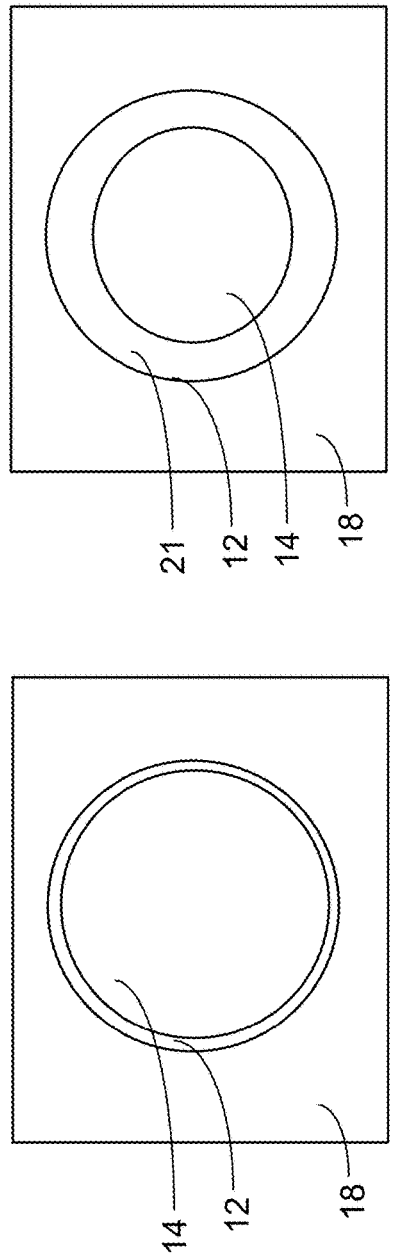

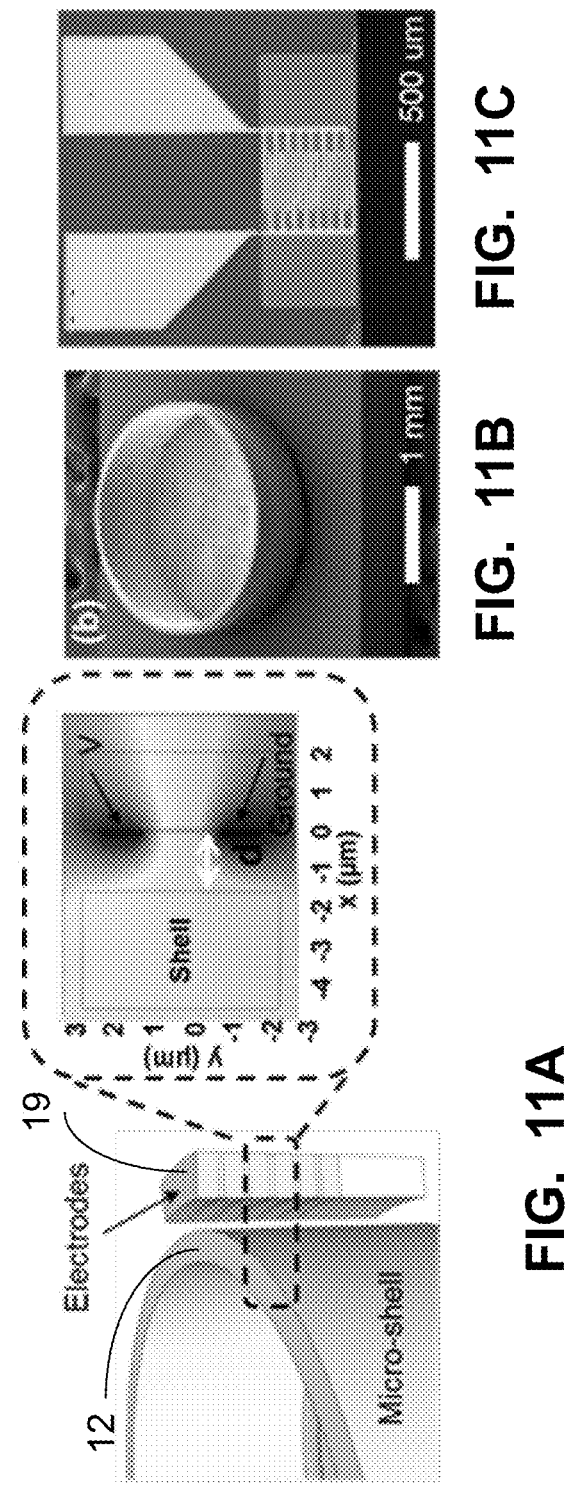

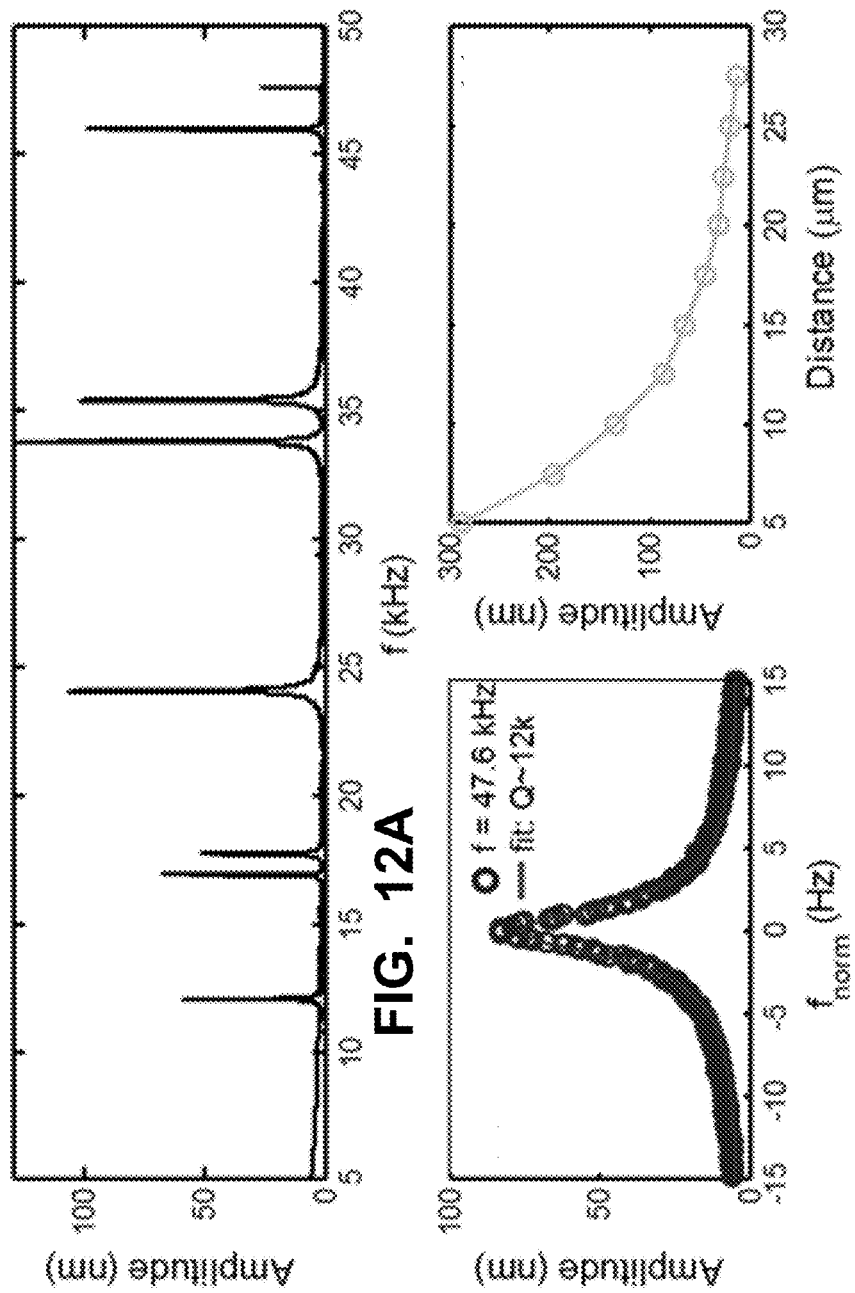

DIELECTRIC HIGH Q MEMS SHELL GYROSCOPE STRUCTURE

CROSS REFERENCE TO RELATED APPLICATIONS

None

TECHNICAL FIELD

This disclosure relates to gyroscopes and oscillators, and in particular to micro electro mechanical systems (MEMS) vibratory gyroscopes and oscillators.

BACKGROUND

State-of-the-art MEMS vibratory gyroscopes typically use hemispherical geometries in conjunction with metal electrodes placed directly in contact with the mechanical resonator structure. As the metal electrodes are implemented, the high mechanical quality factor (Q) of the resonator is spoiled. Also the fabrication tolerance of the metal contacts can reduce the symmetry of the resonator. Reductions in Q and symmetry both reduce the gyroscope sensitivity and increase bias drift. Further, when conducting/semiconducting materials are used, such as Si, Ni, etc., the gyroscope either suffers from mechanical loss of the material or inherent asymmetry due to asymmetry of crystalline materials.

Many state-of-the-art approaches for shell resonators involve complex hemispherical geometries. P. Shao, L. D. Sorenson, X. Gao, and F. Ayazi, "Wineglass on-a-chip" Solid-State Sensors, Actuators, and Microsystems Workshop Hilton Head Island, S.C., Jun. 3-7, 2012, p. 275-278 of Georgia Institute of Technology describe an approach relying on final assembly with epoxy under a microscope. The 'wineglass' shaped $SiO_2$ shells are conformally coated with TiN electrodes which reduce the intrinsic Q of the shell structure. The reported measured Q is less than $5.6E^3$, which is lower than desired. Also this approach is not a wafer scale approach and will likely have alignment and stability issues relating to the use of epoxy.

M. L. Chan, J. Xie, P. Fondal, H. Najar, K. Yamazaki, L. Lin and D. A. Horsley, "Micromachined Polycrystalline Diamond Hemispherical Shell Resonators" Solid-State Sensors, Actuators, and Microsystems Workshop Hilton Head Island, S.C., Jun. 3-7, 2012, p. 355-358 of University of California at Davis collaborating with University of California at Berkeley also describe a hemispherical shell resonator but fabricated from polycrystalline diamond. The reported measured Q is less than $3E^3$, which is lower than Ayazi's above, and lower than desired. The measured frequency splits are about 870 Hz on 34.68 kHz (~2.5%), which leads to decreases in sensitivity and bias stability. Also, the resonant frequency of these structures appears to be very sensitive to anchor mounting radius, as a factor of ten times increase in frequency is measured (20 kHz to 200 kHz) for anchor depths varying from 5 µm to 30 µm. This variability is not desirable. Increasing anchor depth in this case corresponds to increasing anchor radius.

D. Senkal, C. R. Raum, A. A. Trusov, and A. M. Shkel, "*Titania silicate/fused Quartz Glassblowing for 3-D Fabrication of Low Internal Wineglass Micro-structures*" Solid-State Sensors, Actuators, and Microsystems Workshop Hilton Head Island, S.C., Jun. 3-7, 2012, p. 267-270 of University of California at Irvine describe a hemispherical inverted wineglass structure which relies on individual laser ablation to release structures, which is again not a wafer scale approach. An additional problem resulting from this release technique is that the laser ablation for rim release of the inverted wineglass structure will likely perturb symmetry of rim and therefore increase frequency splits and degrade the gyroscope bias stability.

What is needed is a shell gyroscope structure with improved sensitivity and frequency stability. The embodiments of the present disclosure answer these and other needs.

SUMMARY

In a first embodiment disclosed herein, a gyroscope comprises a cylindrical shell having a first end and a second end, a base on the second end of the shell, a substrate, an anchor coupling the base to the substrate, and electrodes for driving and sensing mechanically separated from the cylindrical shell.

In another embodiment disclosed herein, a method of forming a gyroscope comprises forming a cylindrical shell having a first end and a second end, forming a base on the second end of the shell, forming an anchor coupling the base to a substrate, and forming electrodes for driving and sensing mechanically separated from the cylindrical shell.

In yet another embodiment disclosed herein, an oscillator comprises a cylindrical shell having a first end and a second end, a top on the first end of the shell, a base on the second end of the shell, a substrate, an anchor coupling the base to the substrate, and electrodes for driving and sensing mechanically separated from the cylindrical shell.

In another embodiment disclosed herein, a method of forming an oscillator comprises forming a cylindrical shell having a first end and a second end, forming a top on the first end of the shell, forming a base on the second end of the shell, forming an anchor coupling the base to a substrate, and forming electrodes for driving and sensing mechanically separated from the cylindrical shell.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIGS. 1A to 1D show resonant micro-shell structures in accordance with the present disclosure;

FIG. 11A shows an electric gradient force drive mechanism in proximity to a thin dielectric micro-shell, FIG. 11B shows a fabricated micro-shell silicon dioxide structure with a diameter of 1.3 mm, a height of 350 μm, a thickness of 2 μm, and a pedestal height of 10 μm on a Si substrate, FIG. 11C show a drive structure with Au electrodes spaced 3 um apart and an overlapping length of 150 um, FIG. 12A shows a mode spectroscopy of a micro-shell from f=5-50 kHz, FIG. 12B shows a high Q mode at f=47.6 kHz, and FIG. 12C shows a sub-quadratic functional dependence of micro-shell vibration amplitude on micro-shell-drive mechanism distance in accordance with the present disclosure.

DETAILED DESCRIPTION

Figure 2:
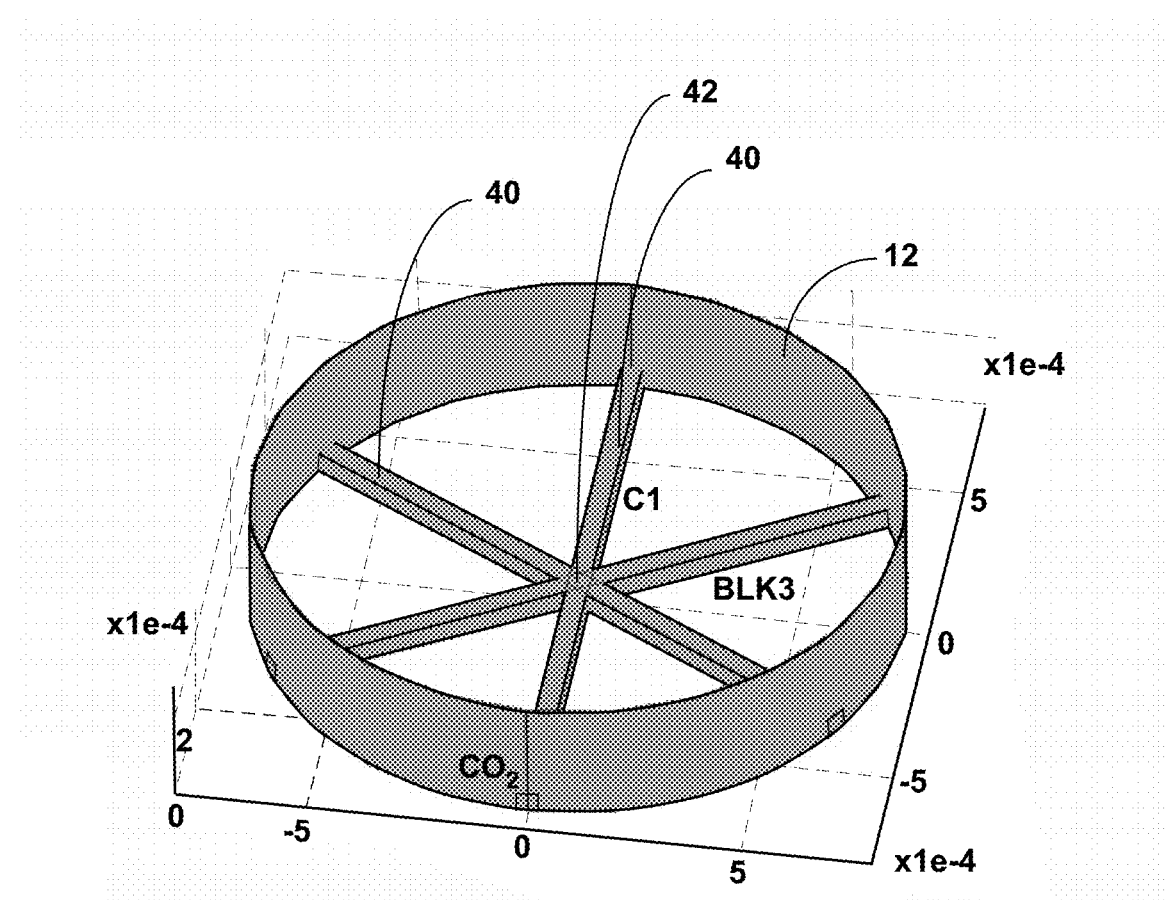
FIG. 2 shows another resonant micro-shell structure in accordance with the present disclosure.

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

A dielectric resonant shell 12 gyroscope structure for detection of rotation and rotation rate is disclosed offering improved sensitivity and frequency stability over the state-of-the-art. The shell 12 may be fabricated using wafer scale manufacturing. The dielectric shell 12 may be $SiO_2$. A straight-walled-cylindrical shell 12 design having a closed base 14 and an open top provides a very low frequency (VLF) resonant response. The base 14 may be planar between the straight walls of the cylindrical shell 12. Very low frequency or VLF refers to radio frequencies (RF) in the range of 3 kHz to 30 kHz.

For a closed base 14 design, the mechanical vibrations are confined to the upper portion of the shell 12 walls. An anchor or pedestal 16 supporting the shell 12 serves to isolate the shell vibration from a substrate 18, which may be silicon (Si), and thereby assists to maintain a high Q for the dielectric shell 12.

Electrodes 19 for driving and sensing are mechanically separated from the shell 12, which provides reduced damping and thereby maintains the inherent high Q of the dielectric shell 12. Drive and sense electrodes 19 do not contact the shell 12 and therefore the high Q of the dielectric shell 12 is not damped through mass loading.

The high degree of symmetry possible for a straight-walled cylindrical shell 12, which is symmetrical around an axis through the center of the cylindrical shell 12, provides improved frequency stability over time and temperature compared with the state-of-the-art, and also provides reduced resonant frequency splits. When a closed top or a rim 21 is added around the top of the shell 12, the shell 12 has a medium frequency to high frequency (HF) resonance and may be used in a gyroscope or as a high performance mechanical oscillator. Medium frequency (MF) refers to radio frequencies (RF) in the range 300 kHz to 3 MHz. High frequency (HF) refers to radio frequencies (RF) in the range 3 MHz to 30 MHz.

The cylindrical shell 12 design has been shown to have a lower resonant frequency than a hemispherical design, which results in improved gyroscope sensitivity and bias stability. In addition, a high degree of symmetry is easier to achieve for the cylindrical design than a hemispherical design, which results in reduced frequency splits and improved gyroscope bias stability.

Using the cylindrical shell 12, a navigation grade single axis micro-electronic mechanical system (MEMS) gyroscope with a bias stability of <0.01 deg/hr may be fabricated with a very small form factor. The cylindrical shell 12 may be produced as a MEMs structure, and because MEMS structures are extremely small and can be produced in CMOS compatible wafer scale manufacturing processes, MEMS gyros provide a significant advantage over current state of the art gyroscopes, such as fiber optic, spinning mass and so on types, especially in applications where cost, size, weight, and power are at a premium.

FIGS. 1A and 1B show side sections of a resonant micro-shell structure with an open top and a resonant micro-shell structure with a closed top, respectively, in accordance with the present disclosure. FIG. 1C shows a top view of the resonant micro-shell structure of FIG. 1A to show that the shell 12 is cylindrical. Each resonant micro-shell structure, shown in FIGS. 1A and 1B, has a cylindrical shell 12 on a base 14, which is supported by an anchor or pedestal 16 on a substrate 18. The resonant micro-shell structure of FIG. 1B has a cover or top 20 on top of the shell 12. The shell diameter 30 may range from 10's of micrometers (μm) to several millimeters, the shell height 32 may range from a few microns to 1 mm, and the shell thickness 34 may range from 100's of nanometers to 10's of microns. FIG. 1D shows a top view of the resonant micro-shell structure of FIG. 1B in which the top 20 is a partial top or rim 21 around the top of the shell 12.

As shown in FIGS. 1A and 1B driving and sensing electrodes 19 are mechanically separated by a gap from the shell 12. Because the drive and sense electrodes 19 do not contact the shell 12, the high Q of the dielectric shell 12 is not damped through mass loading.

The resonant micro-shell structure of FIG. 1A does not have a top 20 and has a lower resonant frequency and is therefore more sensitive to rotation and rotation rate than the resonant micro-shell structure of FIG. 1B with top 20. The top 20 may close the top of the shell 12 or only partially close the top of the shell 12. With the inclusion of the top 20, the structure becomes more rigid and immune to out of plane vibration. By adding the top 20, as shown in FIG. 1B, or the rim 21 around the top of shell 12, as shown in FIG. 1D, the frequency of resonance, which is VLF for the resonant micro-shell structure of FIG. 1A, becomes medium frequency (MF) or high frequency (HF).

The bottom or base 14 of the shell 12 may be patterned, for example with spokes 40 around a hub or center 42, to reduce stress and increase a mechanical Q factor, as shown in FIG. 2. The base 14 of the shell 12 may be etched away to form a pattern, such as spokes 40, as shown in FIG. 2.

Figures 3, 4:
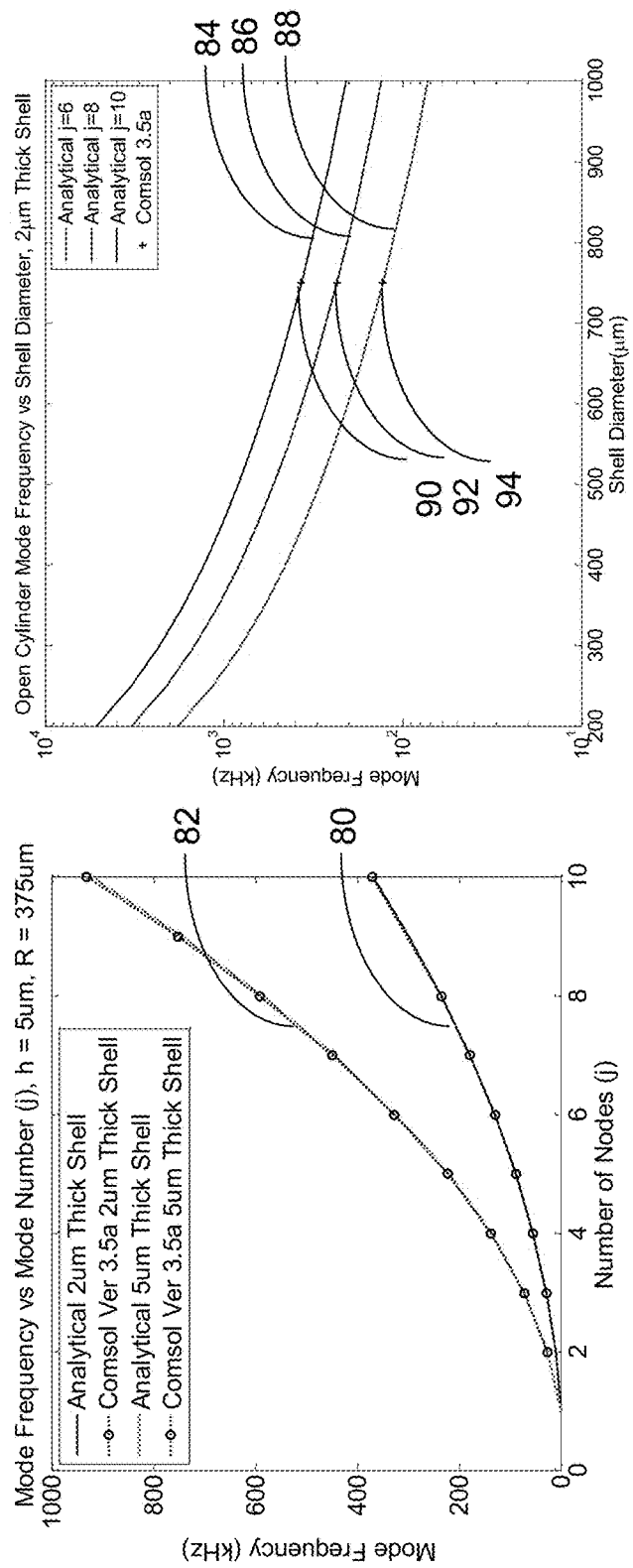
FIG. 3 shows a graph of variation of mode frequency versus mode number for $SiO_2$ shells thicknesses of 4 µm and 4 µm in accordance with the present disclosure.
FIG. 4 shows a graph of variation of mode frequency versus shell diameter for mode numbers j=6, 8 and 10 in accordance with the present disclosure.

A Comsol Finite Element Analysis (FEA) analysis technique has been benchmarked against an analytical approach from "Formulas for natural frequency and mode shape", R. D. Blevins, Krieger Publishing Company, p. 298, 2001 for the resonant frequencies of an open ended cylinder. The approximations used in the analytical approach were valid for j*t/R<<1, where j=mode number, t=shell wall thickness and R=shell radius. As seen in FIG. 3, excellent agreement was observed between the Comsol FEA result and the analytical result for both a 2 µm thick 34 shell 80 and a 5 µm thick 34 shell 82, both of diameter 750 µm, because the respective results essentially are the same. From these results it can be determined that thinner shells 12 and low modal numbers, such as a 2 µm shell 80 versus a 5 µm thick shell 82, result in lower resonant frequencies. A low resonant frequency is desired for high gyroscope bias stability.

Next the effect of the micro-shell diameter 30 on resonant frequency was examined and the result is presented in FIG. 4, which plots resonant frequency versus shell diameter. The solid lines 84, 86, 88 represent the analytical results for a 750 µm diameter, 2 µm thick open ended cylinder with a closed base for mode numbers j=6, 8 and 10. Superimposed on the analytical results are the corresponding simulated Comsol FEA predictions 90, 92, 94 for a 750 µm diameter shell, showing excellent agreement with the analytical result for the same mode numbers. From this chart, it can be determined that a larger diameter 30 shell 12 for an open ended cylinder with a closed base shell results in lower resonant frequencies.

Figure 5:
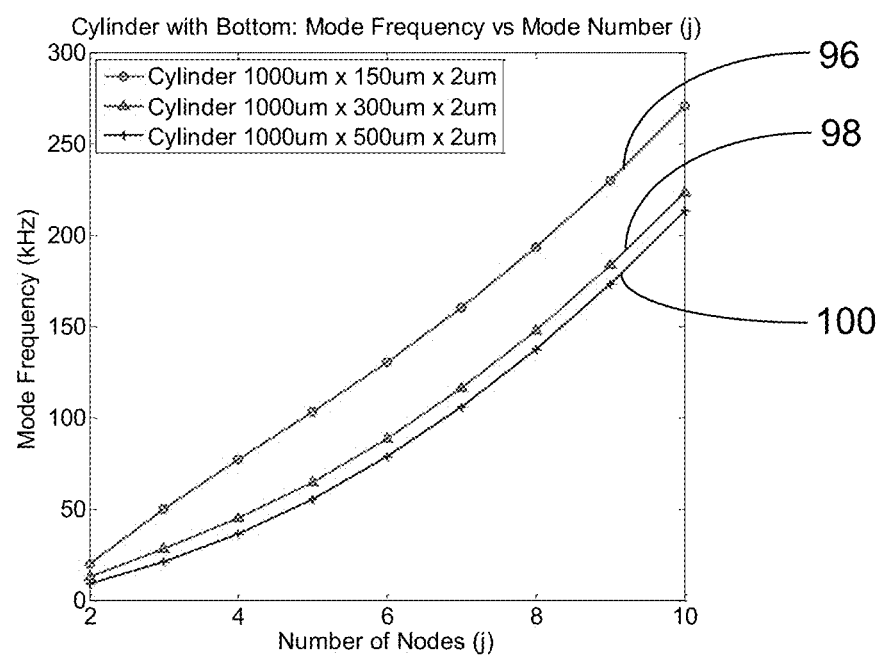
FIG. 5 shows a graph of predicted variation of mode frequency versus mode number for varying shell height of a cylindrical shell with a closed base in accordance with the present disclosure.

FIG. 5 shows the effect of cylinder height for a cylindrical shell 12 with a closed base. The 1000 µm diameter, 2 µm thick and 500 µm tall cylinder 100 of FIG. 5 has a lower order mode (j=2) of 8.9 kHz, compared to the 1000 µm diameter, 2 µm thick and 300 µm tall cylinder 98 of FIG. 5 and the 1000 µm diameter, 2 µm thick and 150 µm tall cylinder 96 of FIG. 5. From this chart, It can be seen that the resonant frequencies decrease with increasing cylinder height 32.

The boundary conditions of the micro-shell 12 also play an important role in determining the resonant frequencies. The first boundary condition is whether the top of the shell 12 is closed, such as top 20 in FIG. 1B, and whether the bottom 14 of the shell 12 is closed. This does not fix anything in space, but merely constrains the motion of the edges.

Figure 6A:
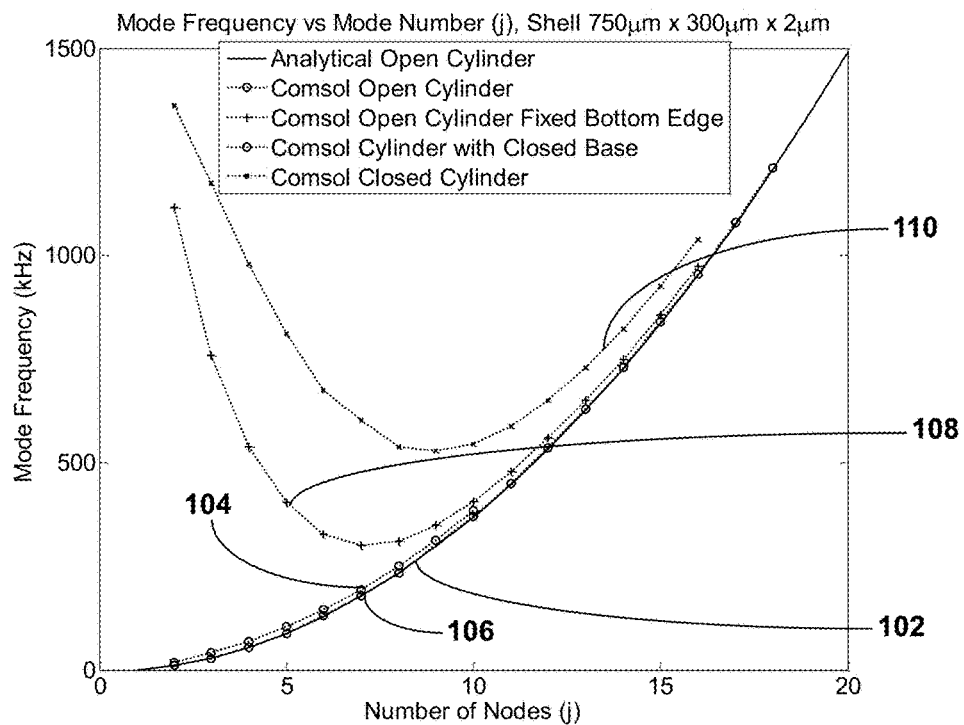
FIG. 6A shows a graph of predicted variation of mode frequency versus mode number for varying cylindrical shell boundary conditions including an open base as shown in FIG. 6B, a closed base as shown in FIG. 6C, and closed top and closed base as shown in FIG. 6D in accordance with the present disclosure.
Figure 6B:
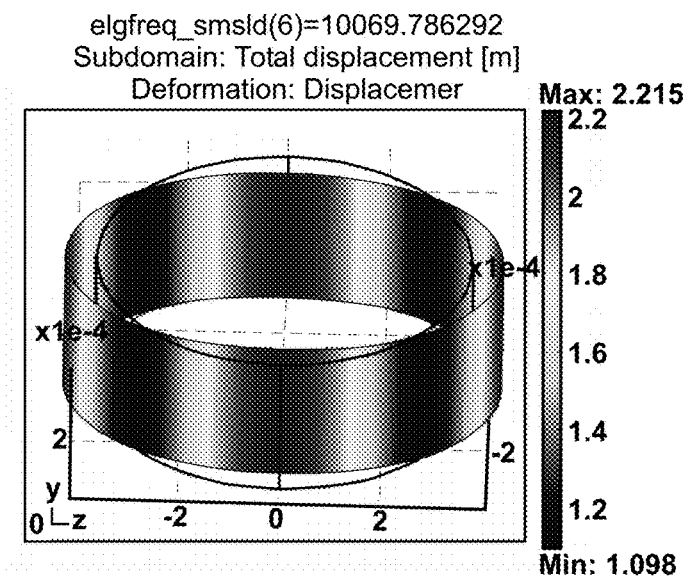
Figure 6C:
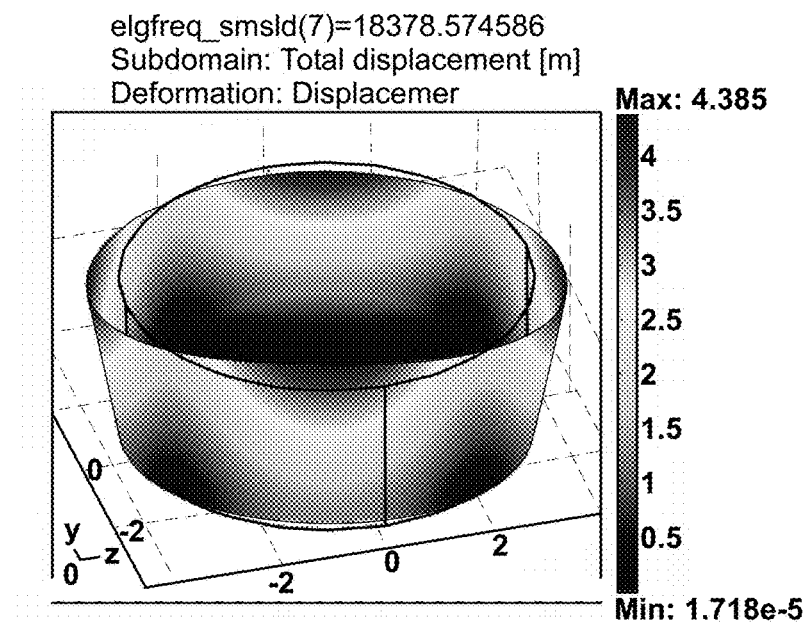

FIG. 6A shows the frequency variation for varying boundary conditions for a shell 12, which is not fixed in space, and which has a shell diameter 30 of 750 µm, a shell height 32 of 300 µm and a shell thickness 34 of 2 µm. The open cylinder mode frequency is compared with a mode frequency for a cylinder having the base closed and also one having both the top and bottom closed. Also compared is the response of an open cylinder with a second boundary condition imposed in which the bottom 14 is fixed in space. As shown in FIG. 6A a cylindrical shell 12 with a closed base 14, as represented in FIG. 6C, has a frequency response 104 similar to the frequency response 106 of a cylindrical shell 12 with an open base 14, as represented in FIG. 6B, as determined by Comsol FEA analysis. For these cases, the frequency of resonance increases with mode number. Also plotted in FIG. 6A is the analytical result 102 per the formulas in Elevens for a cylindrical shell 12 with an open base 14, which agrees well with the frequency response 106 of a cylindrical shell 12 with an open base 14, as determined by Comsol FEA analysis.

Figure 6D:
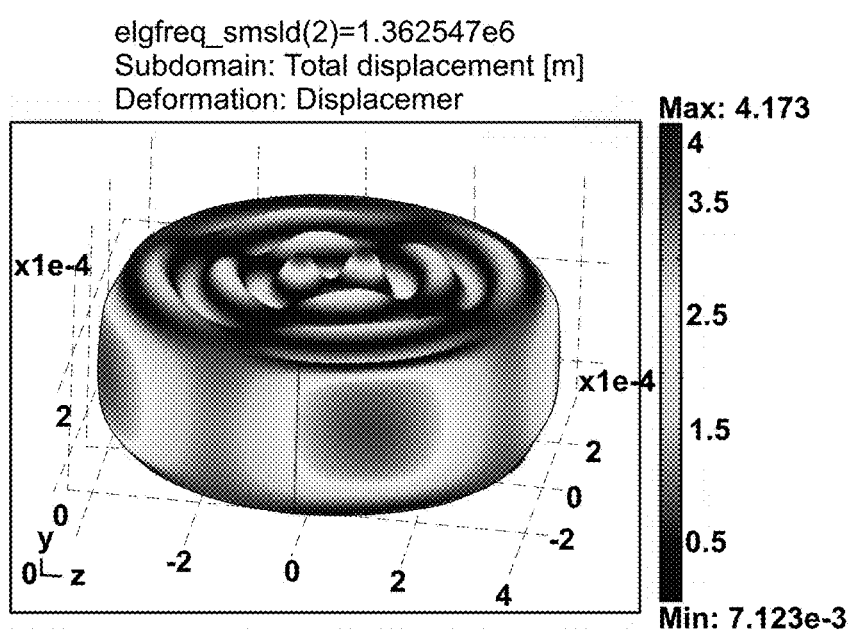

If the motion of the bottom 14 of the shell 12 cylinder walls is constrained by fixing the bottom edge, the frequency response becomes more parabolic in nature and the lowest order modes significantly increase in frequency, as shown in curve 108. If both the bottom 14 and the top 20 are close so that the shell 12 is closed, as represented in FIG. 6D, the frequency response, as shown in curve 110, also becomes more parabolic in nature and the lowest order modes significantly increase in frequency.

Figure 7:
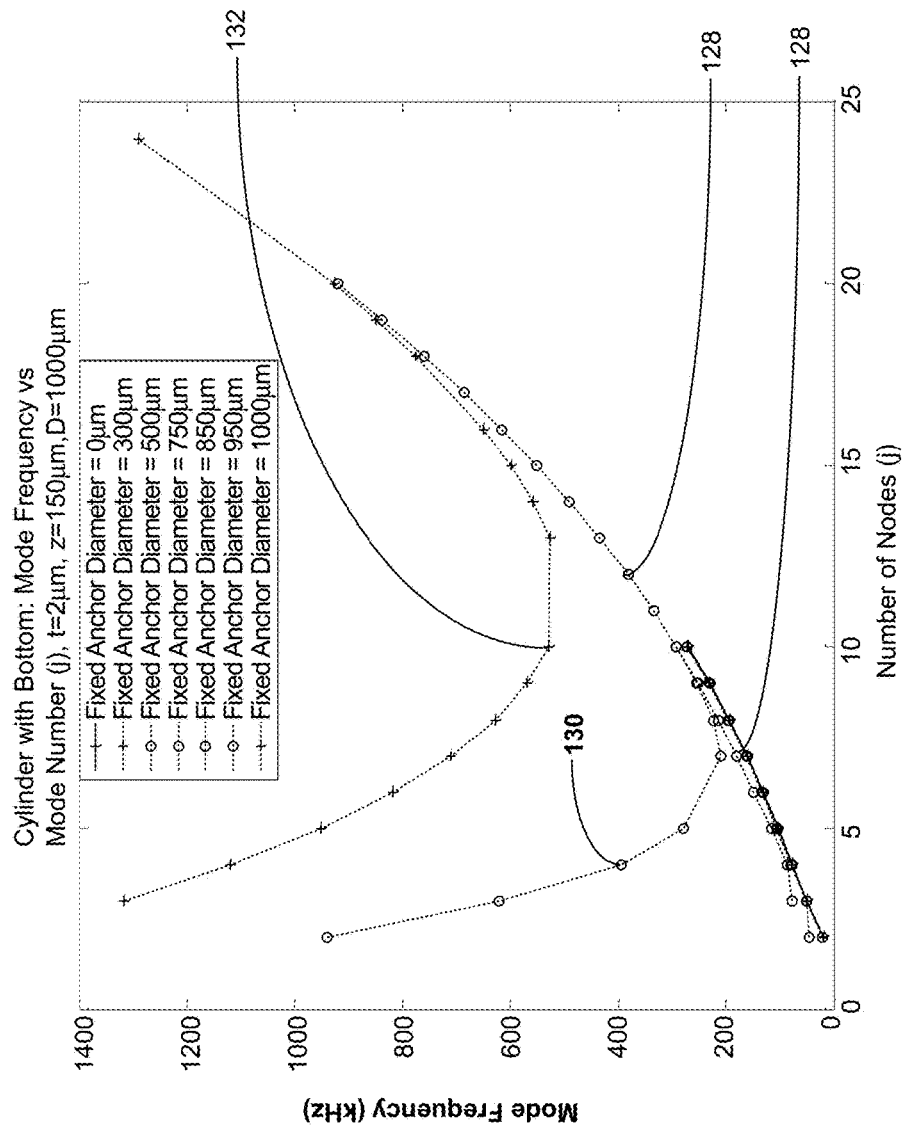
FIG. 7 shows a graph of predicted variation of mode frequency versus mode number for varying support anchor diameters in accordance with the present disclosure.

Thus a shell 12 having a closed base 14 to which an anchor 16 is attached for support of the structure has a desirable mode frequency. FIG. 7 shows a graph of predicted variation of mode frequency versus mode number for varying support anchor 16 diameters. A fixed in space boundary condition is applied to the lower face of the anchor 16. FIG. 7 presents the results for a fixed underside face anchor of varying diameter. The cylinder shell 12 dimensions are 1000 µm shell diameter 30, 150 µm shell height 32, and 2 µm shell thickness 34. As the anchor diameter increases, the area of the anchor 16 underside which is fixed in space also increases.

In FIG. 7 it can be seen that the anchor 16 diameter can be varied up to approximately 850 µm, as shown in curve 128, before any significant change to the frequency response the shell 12. This represents an anchor 16 to shell diameter 30 ratio of 85% and renders the design very tolerant to asymmetries in the base 14 shape, and anchor 16 diameter. As the diameter of the anchor 16 base increases beyond 850 µm or a ratio of 85%, the behaviors for higher order modes greater than 15 remain somewhat constant. However, for lower order modes, the mode frequency increases as the fixed area of the anchor 16 becomes larger than 850 µm or a ratio of 85%. At approximately an anchor 16 diameter above 900 µm, as represented by curves 130 and 132 for 950 µm and 1000 µm, respectively, the mode frequency increases in a parabolic fashion for mode below about 15. Thus, it is desirable to keep the anchor 16 diameter to shell diameter 30 below a ratio of 85%.

Figure 8:
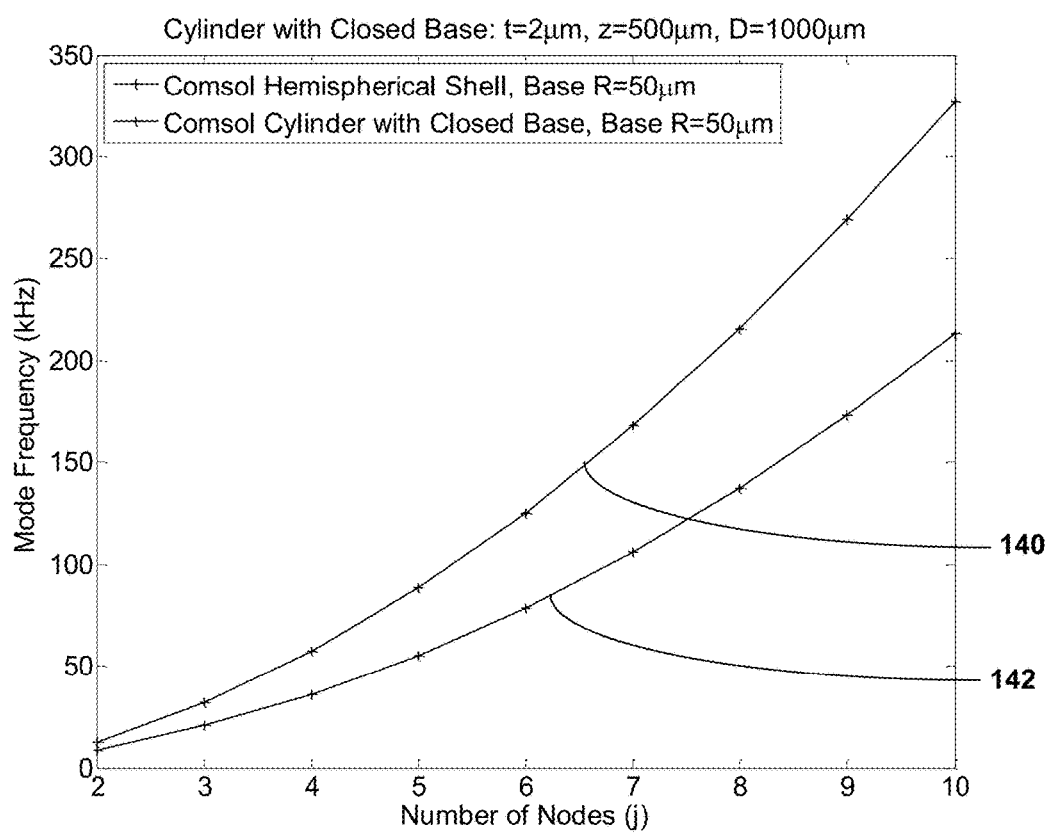
FIG. 8 shows a graph of predicted variation of mode frequency versus mode number for a 500 μm tall cylindrical shell closed on its bottom side compared with a similar aspect ratio hemispherical shell geometry in accordance with the present disclosure.

FIG. 8 shows the simulated performance of a state-of-the-art hemispherical shell geometry with the cylindrical shell 12 of the present disclosure. FIG. 8 compares the performance of shell 12 that has a shell height 32 of 500 µm, a 1000 µm shell diameter 30, and a 2 µm shell thickness 34 with a hemispherical shell design of similar aspect ratio and thickness. The hemispherical shell results are shown by curve 140, and the cylindrical shell 12 results are shown by curve 142. At the lowest order mode of j=2, the cylindrical shell 12 has a mode frequency of 8.9 kHz, whereas the hemispherical shell has a mode frequency of 12.9 kHz. A lower mode frequency is desirable.

Figures 9, 10:
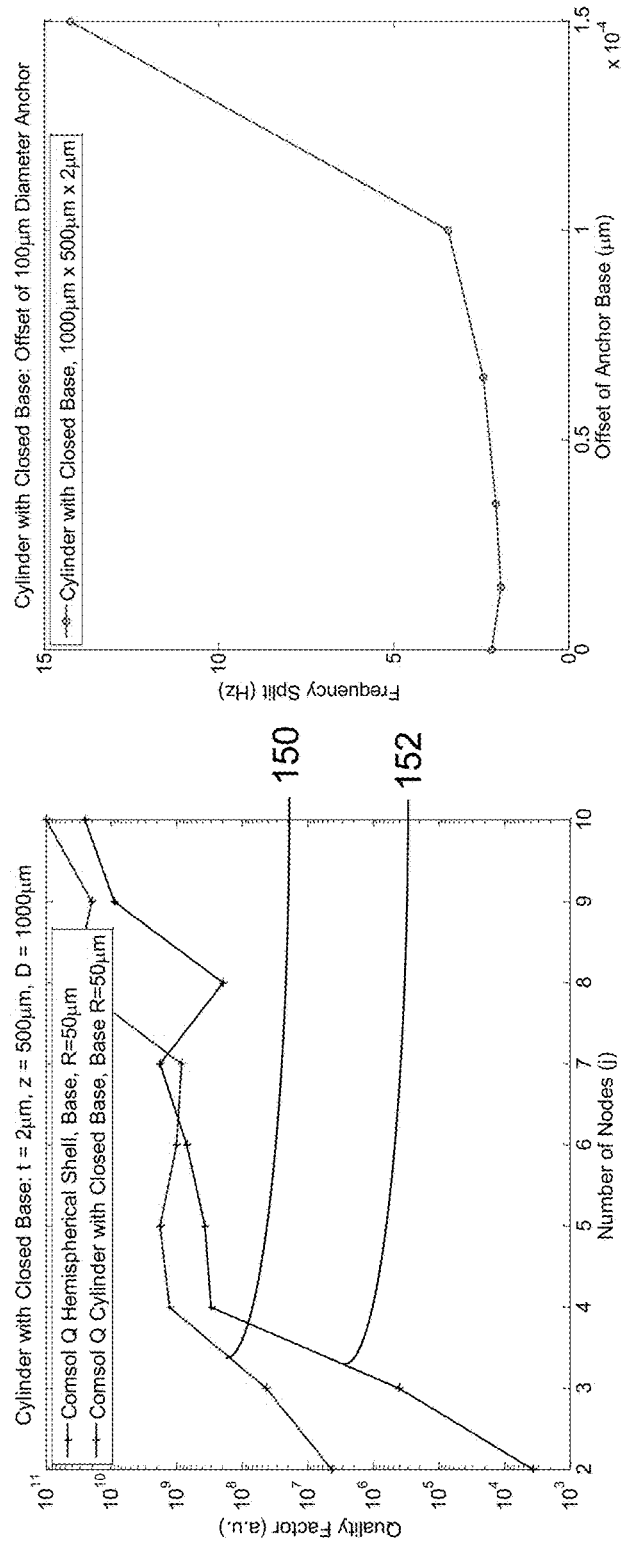
FIG. 9 shows a graph of predicted variation of Q versus mode number for a 500 μm tall cylindrical shell closed on its bottom side compared with a similar hemispherical shell geometry in accordance with the present disclosure.
FIG. 10 shows a graph of frequency splits for a cylindrical shell with a closed base versus an anchor center offset.

The corresponding predicted Q is also higher for the cylindrical shell 12, as shown by curve 150 in FIG. 9, which shows a Q of $4.2 \times 10^6$ for the j=2 mode, versus a Q of about $0.5 \times 10^3$ for the j=2 mode for the hemispherical shell, as shown by curve 152 in FIG. 9. The Q's of each design typically cross over around mode 6-7, after which the Q of the hemispherical shell becomes higher than the Q of the cylindrical shell 12. The lower operating mode frequency and higher Q obtained for low order modes with the cylindrical shell 12 provides an improved bias stability in a gyroscope application.

Frequency splits for a cylindrical shell 12 with a closed base 14 are in part determined by the centering of the anchor 16 on the base 14. For a shell 12 with shell diameter 30 of 1000 µm, a shell height 32 of 500 µm, and a shell thickness 34 of 2 µm, and for an anchor 16 base of diameter=100 microns, the two j=2 mode frequencies are f1=8.9307 kHz for an anchor 16 base having a center offset of zero, and f2=8.9329 kHz for an anchor 16 base having a center offset of +65 µm. Thus, the anchor 16 base can be offset from the center of the base 14 by about 65 µm, or 6.5%, in the z-direction and the magnitude of the frequency split still lies within about 2.2 Hz, as shown in FIG. 10. By an anchor 16 base offset of +100 µm in the z-direction, the frequency split increases to approximately 3.4 Hz. Therefore, the structure is very tolerant to imperfections in anchor size and alignment.

In summary, a straight-walled-thin cylindrical shell 12 having a closed base and an open top provides a low resonant frequency response well suited to integrated gyroscope applications. For this closed base design, the mechanical vibrations are confined to the upper portion of the shell 12 walls. An anchor 16 supporting the base 14 of the cylindrical shell 12 isolates the shell vibration from the substrate 18 and thereby assists to maintain the high Q of the dielectric shell 12. Additionally, mechanical separation of the electrodes 19 from the shell serves to reduce damping and thereby maintain the inherent high Q of the dielectric shell. The design is tolerant to imperfections and misalignments inherent to MEMS and very large scale integration (VLSI) fabrication techniques. With a very simple modification of the geometry of adding a closed top 20 or a rim 21 to the shell 12, the VLF resonance frequency becomes a HF resonance frequency.

FIG. 11A shows an electric gradient force drive mechanism 19 in proximity to a thin dielectric micro-shell 12. The drive mechanism 19 operates by generating a gradient electric-field force from fields of a set of electrodes placed adjacent to the gyroscope structure. The electrodes 19 may be interdigitated. An applied AC voltage on the drive mechanism generates a time varying force directly onto the dielectric gyroscope structure thereby resonantly exciting specific natural vibrational modes. This transduction mechanism enables mechanical actuation of a pristine dielectric structure without the need for direct metallization on the dielectric structure, which could otherwise degrade mechanical performance.

A tradeoff exists when considering optimal materials for micro-scale vibratory gyroscope structures. The use of a high quality factor (Q), thermally stable, dielectric material conflicts with the need for an electrically conductive materials or coatings necessary for using the prevalent electrostatic drive/sense mechanisms, as described by N. Yazdi, F. Ayazi, K. Najafi, Proc. IEEE, Vol. 86, pp. 1640-1659 (1998), S. A. Zotov, A. A. Trusov, A. M. Shkel, J. MEMS, Vol. 21, No. 3, pp. 509-510 (2012), L. D. Sorenson, P. Shao, F. Ayazi, Proc. IEEE MEMS 2013, pp. 169-172 (2013), J. Cho, J.-K. Woo, J. Yan, R. L. Peterson, K. Najafi, IEEE Transducers 2013, pp. 1847-1850 (2013), and A. Heidari, M.-L. Chan, H.-A. Yang, G. Jaramillo, P. Taheri-Tehrani, P. Fond, H. Nanjar, K. Yamazaki, L. Lin, D. Horsley, Proc. IEEE Transducers 2013, pp. 2415-2418 (2013), which are incorporated herein by reference. A technique for driving a dielectric micro-shell without placing metal electrodes directly on the structure leads to higher performance by maintaining the natively high Q of the dielectric used. Electrical gradient forces have been explored for the actuation of nano-scale devices, as described by Q. P. Unterreithmeier, E. M. Weig, J. P. Kotthaus, Nature, Vol. 458, pp. 1001-1004 (2009), which is incorporated herein by reference, and applied to an accelerometers, as described by S. Aoyagi, Y. C. Tai, Proc. IEEE Transducers 2003, pp. 1382-1386 (2003), which is incorporated herein by reference, but have yet been used in a micro-scale gyroscope in the prior art.

The electric gradient force drive mechanism 19, as shown in FIG. 11A, may include a set of interdigitated electrodes of alternating potentials, and is placed adjacent to a thin dielectric micro-shell. Forces as high of 10 nN are predicted based on finite element simulations of the fringe fields, as shown in the inset of FIG. 11A. Such forces at low voltages of less than 10V are easily sufficient to drive a high Q micro-shell on resonance. The micro-shell is designed to have vertical walls to allow the drive mechanism to be in close proximity and to have Coriolis sensitive wine-glass resonant modes with frequencies f<50 kHz. A 1.3 mm diameter micro-shell fabricated from silicon dioxide is shown in FIG. 11B and rests on a pedestal 10 um above a silicon substrate. A drive mechanism, shown in FIG. 11C may be fabricated from Au on a Si substrate.

FIG. 12A shows mode spectroscopy for the micro-shell under vacuum (P~1×10$^{-1}$ Torr) with the drive mechanism in proximity with distance d to the micro-shell and sweeping the frequency of a sinusoidal drive signal $V_{pp}$=10V from 5-50 kHz. Micro-shell motion may be measured using a laser vibrometer and a sample spectrum is shown in FIG. 12A. The Q of individual modes can be probed by taking high resolution frequency scans as shown in FIG. 12B, where a Q of 12 k is achieved. The power of this technique is shown by measuring the amplitude of vibration as a function of distance while the micro-shell is driven on resonance (f=47.6 kHz) as shown in FIG. 12C, Amplitude of 300 nm is achieved at d=5 µm gap and amplitudes greater than 100 nm are achievable with gaps up to d=12 µm for modest voltages <10 V.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A resonant structure comprising:
   a cylindrical shell having a first end and a second end;
   a base on the second end of the shell, wherein the base is planar;
   a substrate;
   an anchor coupling the base to the substrate;
   electrodes for driving and sensing mechanically separated from the cylindrical shell; and
   a top on the first end of the shell;
   wherein the top fully encloses or partially encloses the first end of the shell.

2. The resonant structure of claim 1 wherein the shell comprises a dielectric.

3. The resonant structure of claim 1 wherein:
   the shell comprises $SiO_2$; and
   the substrate comprises silicon.

4. The resonant structure of claim 1 wherein:
   a diameter of the cylindrical shell ranges from 10 micrometers (μm) to 2 millimeters;
   a height of the shell ranges from 2 microns to 1 mm; and
   a thickness of the shell ranges from 100 nanometers to 30 microns.

5. The resonant structure of claim 1 wherein the resonant frequency of the shell has a range from 3 kHz to 30 MHz.

6. The resonant structure of claim 1 wherein the resonant structure comprises a micro-electronic mechanical system (MEMS).

7. The resonant structure of claim 1 wherein a bias stability is <0.01 deg/hr.

8. The resonant structure of claim 1 wherein the anchor has a diameter that is less than 90% of a diameter of the cylindrical shell.

9. The resonant structure of claim 1 wherein the anchor has a center that is offset from a center of the base on the cylindrical shell by less than 10% of the diameter of the cylindrical shell.

10. The resonant structure of claim 1 wherein the cylindrical shell has straight walls and is symmetrical around an axis.

11. The resonant structure of claim 1 wherein a quality factor Q of the resonant structure is equal to or greater than $4.2 \times 10^6$.

12. A method of forming a resonant structure comprising:
    forming a cylindrical shell having a first end and a second end;
    forming a base on the second end of the shell, wherein the base is planar;
    forming an anchor coupling the base to a substrate;
    forming electrodes for driving and sensing mechanically separated from the cylindrical shell; and
    forming a top on the first end of the shell;
    wherein the top fully encloses or partially encloses the first end of the shell.

13. The method of claim 12 comprising:
    using a wafer scale fabrication process to form the shell.

14. The method of claim 12 wherein a quality factor Q of the resonant structure is equal to or greater than $4.2 \times 10^6$.

15. A resonant structure comprising:
    a cylindrical shell having a first end and a second end;
    a base on the second end of the shell, wherein the base is planar;
    a substrate;
    an anchor coupling the base to the substrate; and
    electrodes for driving and sensing mechanically separated from the cylindrical shell;
    wherein the base comprises a plurality of spokes, each spoke coupled to the second end of the shell and each spoke coupled to each other spoke at a center or hub.

16. The resonant structure of claim 15 further comprising:
    a top on the first end of the shell;
    wherein the top fully encloses or partially encloses the first end of the shell.

17. The resonant structure of claim 15 wherein:
    the shell comprises $SiO_2$; and
    the substrate comprises silicon.

18. The resonant structure of claim 15 wherein:
    a diameter of the cylindrical shell ranges from 10 micrometers (μm) to 2 millimeters;
    a height of the shell ranges from 2 microns to 1 mm; and
    a thickness of the shell ranges from 100 nanometers to 30 microns.

19. The resonant structure of claim 15 wherein the resonant frequency of the shell has a range from 3 kHz to 30 MHz.

20. The resonant structure of claim 15 wherein the resonant structure comprises a micro-electronic mechanical system (MEMS).

21. The resonant structure of claim 15 wherein the anchor has a diameter that is less than 90% of a diameter of the cylindrical shell.

22. The resonant structure of claim 15 wherein the anchor has a center that is offset from a center of the base on the cylindrical shell by less than 10% of the diameter of the cylindrical shell.

23. The resonant structure of claim 15 wherein the cylindrical shell has straight walls and is symmetrical around an axis.

24. The resonant structure of claim 15 wherein a quality factor Q of the resonant structure is equal to or greater than $4.2 \times 10^6$.

25. A method of forming an resonant structure comprising:
    forming a cylindrical shell having a first end and a second end;
    forming a base on the second end of the shell, wherein the base is planar;
    forming an anchor coupling the base to a substrate; and
    forming electrodes for driving and sensing mechanically separated from the cylindrical shell;
    wherein the base is formed to have a plurality of spokes, each spoke coupled to the second end of the shell and each spoke coupled to each other spoke at a center or hub.

26. The method of claim 25 further comprising:
    forming a top on the first end of the shell;
    wherein the top fully encloses or partially encloses the first end of the shell.

27. The method of claim 25 comprising:
    using a wafer scale fabrication process to form the shell.

28. The method of claim 25 wherein the cylindrical shell is formed to have straight walls and to be symmetrical around an axis.

29. The method of claim 25 wherein a quality factor Q of the resonant structure is equal to or greater than $4.2 \times 10^6$.

* * * * *